(12) United States Patent
Magoteaux

(10) Patent No.: US 6,540,257 B2
(45) Date of Patent: Apr. 1, 2003

(54) AIR BAG MODULE WITH VENT

(75) Inventor: David G. Magoteaux, Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/829,457

(22) Filed: Apr. 10, 2001

(65) Prior Publication Data

US 2002/0145274 A1 Oct. 10, 2002

(51) Int. Cl.$^7$ .......................... B60R 21/30; B60R 21/28
(52) U.S. Cl. ........................................ 280/739; 280/742
(58) Field of Search ..................... 280/739, 742, 280/741, 735, 737

(56) References Cited

U.S. PATENT DOCUMENTS

| | | | |
|---|---|---|---|
| 3,567,245 A | | 3/1971 | Ekstrom |
| 3,861,712 A | * | 1/1975 | Matsui et al. ................ 280/735 |
| 3,966,228 A | | 6/1976 | Neuman |
| 5,007,662 A | * | 4/1991 | Abramczyk et al. ........ 280/739 |
| 5,022,424 A | * | 6/1991 | Reynolds et al. .......... 137/68.1 |
| 5,219,179 A | * | 6/1993 | Eyrainer et al. ............ 280/739 |
| 5,524,925 A | * | 6/1996 | Rose et al. ................. 280/739 |
| 5,566,975 A | * | 10/1996 | Stull et al. .................. 280/739 |
| 5,664,802 A | * | 9/1997 | Harris et al. ................ 280/736 |
| 5,695,214 A | | 12/1997 | Faigle et al. |
| 5,718,447 A | * | 2/1998 | Rose et al. ................. 280/739 |
| 5,820,162 A | * | 10/1998 | Fink ............................ 280/742 |
| 5,853,192 A | | 12/1998 | Sikorski et al. |
| 5,899,494 A | | 5/1999 | Lane, Jr. |
| 5,918,901 A | * | 7/1999 | Johnson et al. ............. 280/739 |
| 6,039,346 A | * | 3/2000 | Ryan et al. ................. 280/739 |
| 6,158,770 A | * | 12/2000 | Ryan et al. ................. 280/739 |
| 6,161,866 A | * | 12/2000 | Ryan et al. ................. 280/739 |
| 6,199,895 B1 | * | 3/2001 | Seymour .................... 280/739 |
| 6,213,502 B1 | * | 4/2001 | Ryan et al. ................. 280/738 |
| 6,247,726 B1 | * | 6/2001 | Ryan ......................... 280/738 |
| 6,357,791 B1 | * | 3/2002 | Faigle et al. ................ 280/736 |
| 6,439,603 B2 | * | 8/2002 | Damman et al. .......... 280/739 |

* cited by examiner

Primary Examiner—Paul N. Dickson
Assistant Examiner—Joselynn Y. Sliteris
(74) Attorney, Agent, or Firm—Tarolli, Sundheim, Covell, Tummino & Szabo L.L.P.

(57) ABSTRACT

A vehicle occupant protection apparatus (10) includes a sensor (86) for sensing a vehicle crash. An inflatable vehicle occupant protection device (12) has a deflated condition and an inflated condition for helping to protect the vehicle occupant. An inflation fluid source (38) is actuatable to provide inflation fluid to inflate the inflatable device (12). A housing (16) directs inflation fluid under pressure from the inflation fluid source (38) toward the inflatable device (12) upon actuation of the inflation fluid source. The housing (16) has at least one burst panel (44) attached to the housing. Initiating means (76), when actuated, enables the at least one burst panel (44) to detach from the housing (16) to a condition spaced apart from the housing to enable flow of inflation fluid out of the housing through an opening (74) in the housing.

26 Claims, 4 Drawing Sheets

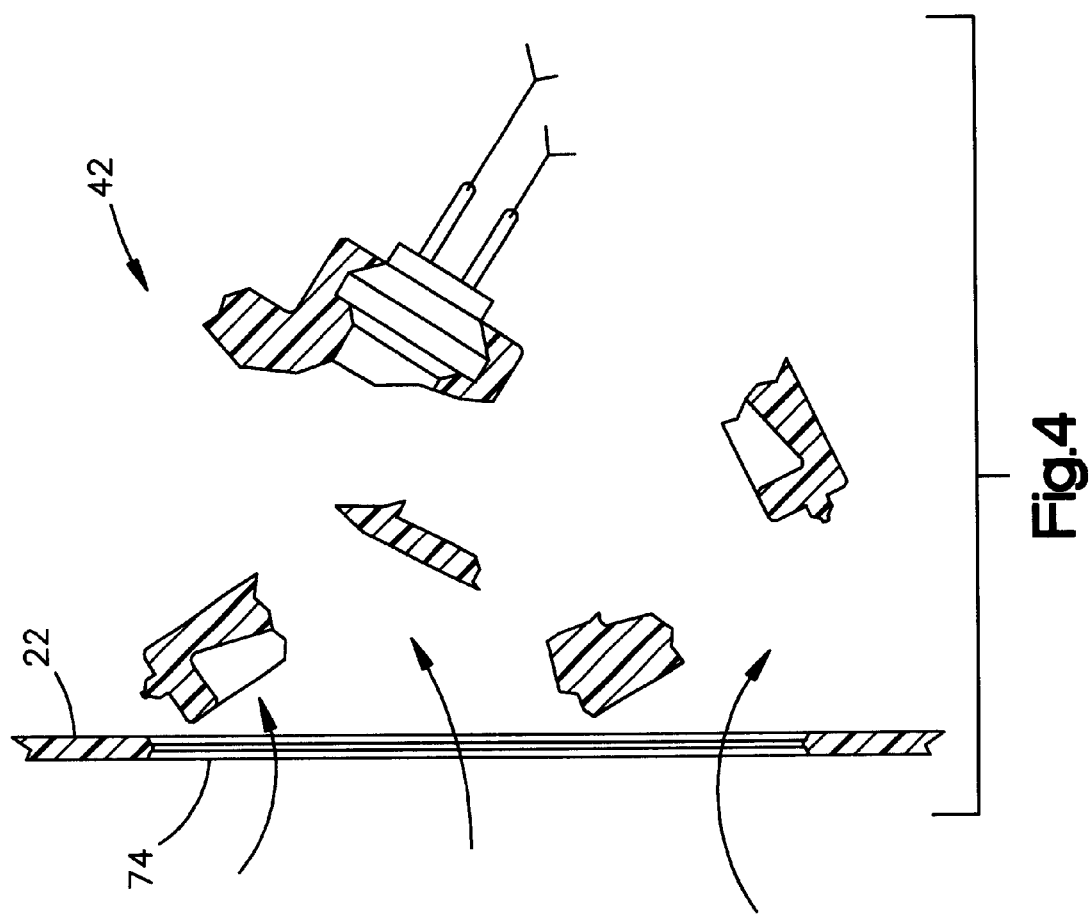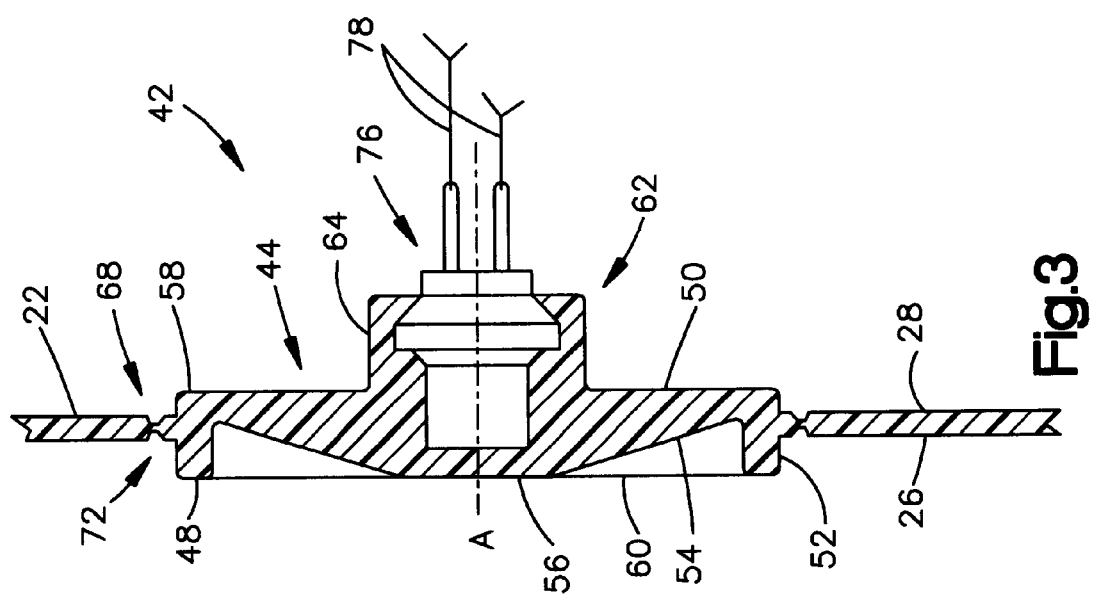

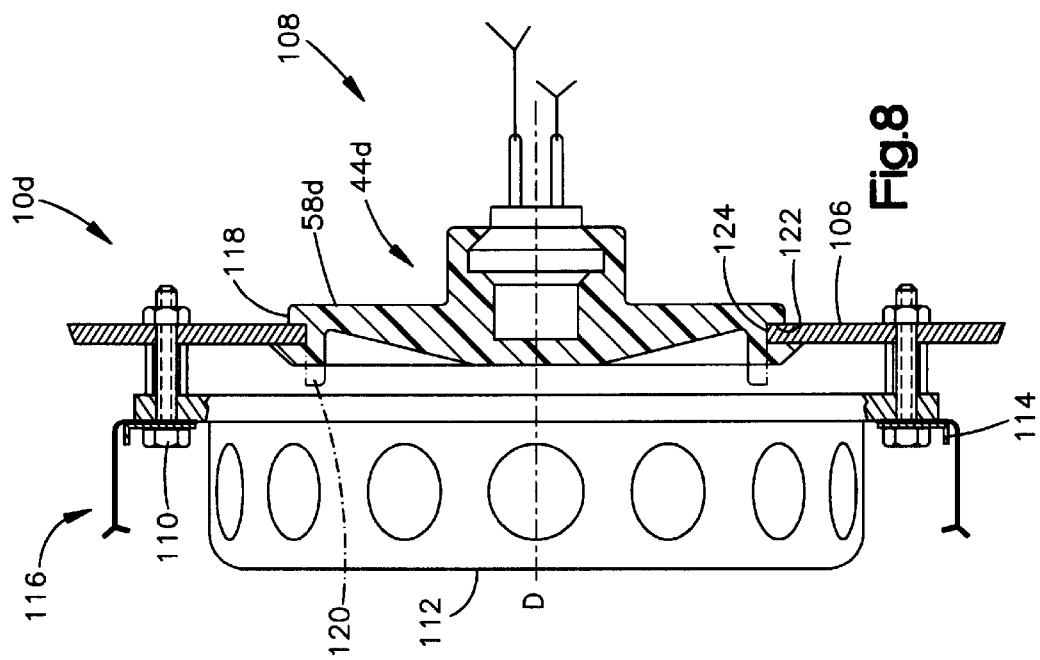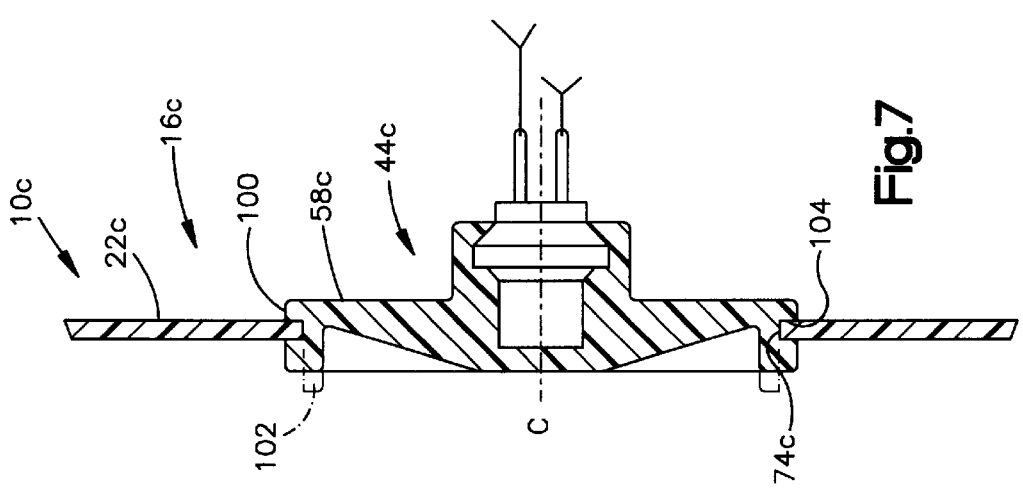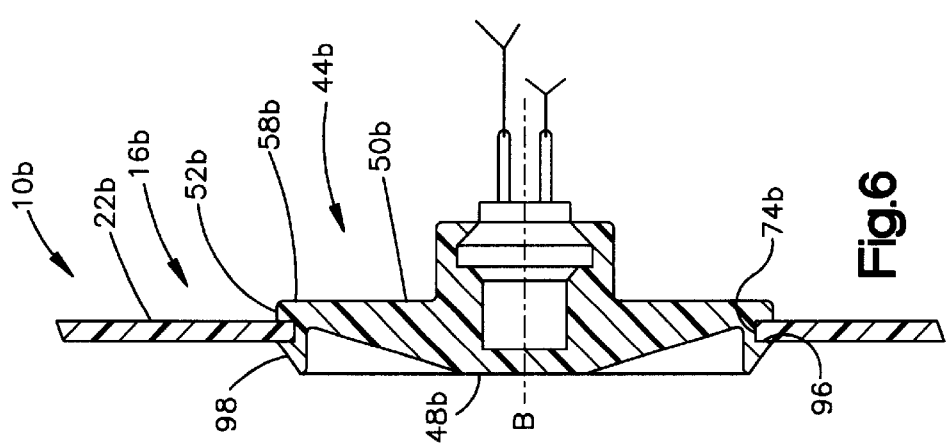

AIR BAG MODULE WITH VENT

BACKGROUND OF THE INVENTION

1. Technical Field

The present invention relates to a vehicle occupant protection apparatus including an inflatable occupant protection device, such as an air bag. In particular, the present invention relates to an air bag module in which inflation fluid is selectively vented from a housing of the module in order to control the deployment of the air bag.

2. Description of the Prior Art

It is known to inflate an air bag to help protect a vehicle occupant in the event of sudden deceleration such as occurs in a vehicle collision. The air bag is stored in a deflated condition in a housing. An inflator, when actuated, provides a large volume of inflation fluid to inflate the air bag into a position to help protect the vehicle occupant.

Under normal circumstances, substantially all of the inflation fluid from the inflator is directed into the air bag to inflate the air bag. In some circumstances, however, it may be desirable to control or limit the amount of inflation fluid directed into the air bag. For example, if a vehicle collision occurs at a low speed, then it may be desirable to reduce the speed and force with which the air bag inflates. It is known to vent inflation fluid from the housing of an air bag module in such circumstances, so that less inflation fluid is directed into the air bag.

SUMMARY OF THE INVENTION

The present invention is a vehicle occupant protection apparatus including a sensor for sensing a vehicle crash. An inflatable vehicle occupant protection device has a deflated condition and an inflated condition for helping to protect the vehicle occupant. An inflation fluid source is actuatable to provide inflation fluid to inflate the inflatable device. A housing directs inflation fluid under pressure from the inflation fluid source toward the inflatable device upon actuation of the inflation fluid source. The housing has at least one burst panel attached to the housing. Initiating means, when actuated, enables the at least one burst panel to detach from the housing to a condition spaced apart from the housing to enable flow of inflation fluid out of the housing through a vent opening in the housing.

In one embodiment, the vehicle occupant protection apparatus includes an inflatable vehicle occupant protection device having a deflated condition and an inflated condition for helping to protect the vehicle occupant. An inflation fluid source is actuatable to provide inflation fluid to inflate the inflatable device. A structure provides an opening for enabling flow of inflation fluid away from the inflatable device. The structure has at least one burst panel with a first condition closing the opening and a second condition spaced apart from the structure and enabling flow of inflation fluid through the opening. An initiating means, when actuated, enables the burst panel to move from the first condition to the second condition to enable flow of inflation fluid through the opening.

BRIEF DESCRIPTION OF THE DRAWINGS

The foregoing and other features of the present invention will become apparent to those skilled in the art to which the present invention relates upon reading the following description of the invention with reference to the accompanying drawings, in which:

FIG. 3 is a sectional view taken along lines 3—3 of FIG. 2;

FIG. 4 is a view similar to FIG. 3 showing the apparatus in a different condition;

FIG. 6 is a view similar to FIG. 3 of a third embodiment of the apparatus of FIG. 1;

FIG. 7 is a view similar to FIG. 3 of a fourth embodiment of the apparatus of FIG. 1; and FIG. 8 is a schematic plan view of a fifth embodiment of a portion of the apparatus of FIG. 1.

DETAILED DESCRIPTION OF THE INVENTION

The present invention relates to a vehicle occupant protection apparatus including an inflatable occupant protection device, such as an air bag. In particular, the present invention relates to an air bag module from which inflation fluid is selectively vented in order to control the speed and force of deployment of the inflating air bag.

Figure 1:
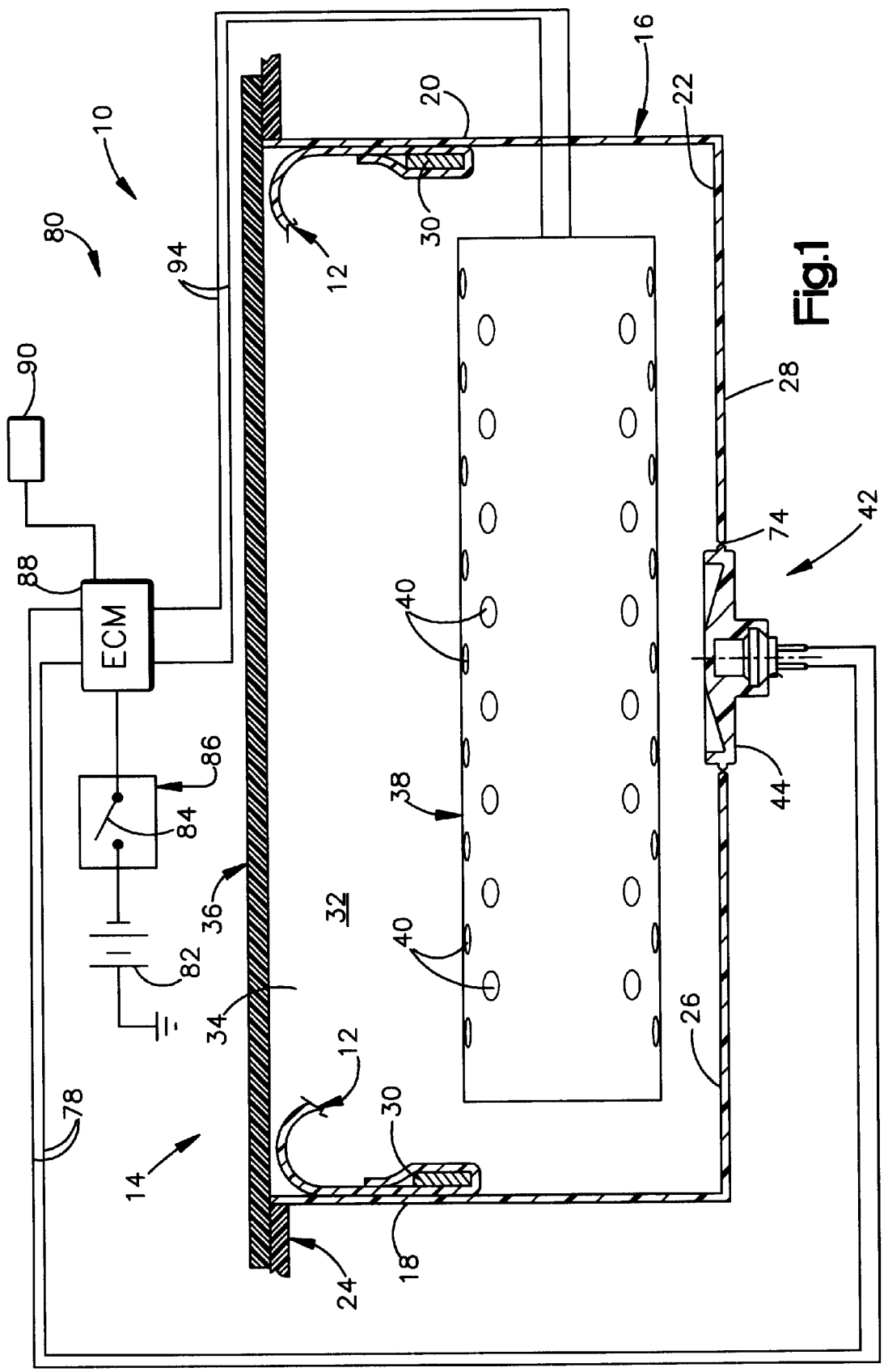
FIG. 1 is a schematic illustration, partially in section, of a vehicle occupant safety apparatus constructed in accordance with the present invention.

As representative of the present invention, FIG. 1 illustrates a vehicle occupant protection apparatus 10 that is constructed in accordance with the present invention. The apparatus 10 includes an inflatable vehicle occupant protection device 12 of the type commonly known as an air bag. The air bag 12 forms a part of an air bag module indicated generally at 14. Other actuatable vehicle occupant protection devices that can be used in accordance with the invention include, for example, inflatable knee bolsters, inflatable head liners, inflatable side curtains, knee bolsters actuated by air bags, and seat belt pretensioners.

The air bag module 14 also includes a housing 16. The housing 16, as illustrated, is constructed of plastic but could, alternatively, be formed of metal. The housing 16 is a box-like structure having a plurality of walls including first and second opposite side walls 18 and 20 and a back wall 22. Although the housing 16 is shown as a separate structure, which is mounted in the vehicle instrument panel 24, such a housing could alternatively be defined by the structure of the instrument panel, or by another part of the vehicle from which the air bag 12 is to be inflated to help protect the vehicle occupant.

The back wall 22 of the housing 16 has an inner side surface 26 and an outer side surface 28. The air bag 12 is secured to the side walls 18 and 20 of the housing 16 by a retainer or retaining ring 30. The walls of the housing 16, including the side walls 18 and 20 and the back wall 22, define a chamber 32 in the housing. The air bag 12 is located in the chamber in the housing 16.

The housing 16 is mounted in a vehicle instrument panel 24 in a known manner (not shown). The back wall 22 of the housing 16 is oriented toward the front of the vehicle in which the air bag module 14 is mounted. A deployment opening 34 is defined between the side walls 18 and 20 of the housing 16. The deployment opening 34 is oriented generally toward the rear of the vehicle in which the air bag module 14 is mounted, that is, toward an occupant of the vehicle. A deployment door or cover 36, which may form a portion of the vehicle instrument panel 24, closes the deployment opening 34 when the air bag 12 is in the deflated condition.

An inflator 38 is mounted in the chamber 32 of the housing 16 in a known manner (not shown). The inflator 38 comprises a source of inflation fluid for inflating the air bag 12. As known in the art, the inflator 38 may contain an ignitable gas-generating material which, when actuated, rapidly generates a large volume of gas. The inflator may alternatively contain a stored quantity of pressurized inflation fluid and ignitable material for heating the inflation fluid. The inflator 38 has a plurality of fluid outlet openings 40 though which inflation fluid is directed into the chamber 32 in the housing 16 upon actuation of the inflator.

Figure 2:
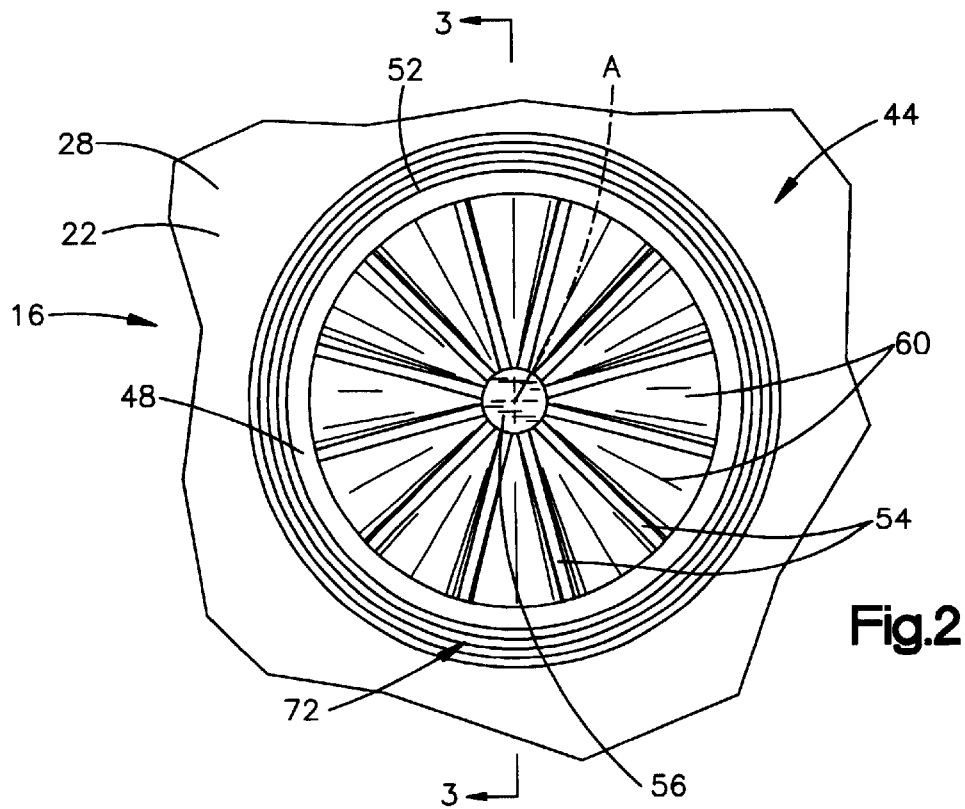
FIG. 2 is a schematic plan view of a portion of the apparatus of FIG. 1.

The apparatus 10 includes a vent assembly 42 (FIGS. 2 and 3). The vent assembly 42 includes a detachable portion, or burst panel, 44 on the housing. The burst panel 44 is constructed from one of a variety of rigid or brittle materials including but not limited to plastic, powdered metal, a composite of plastic and powdered metal, or wood fiber. The burst panel 44 is preferably formed as one piece with the back wall 22 of the housing 16, but is substantially thicker than the back wall 22 of the housing 16.

The burst panel 44 has a disc-like configuration with parallel, circular inner 48 and outer 50 major side surfaces centered on an axis A. A cylindrical outer peripheral surface 52 of the burst panel 44 extends between the inner 48 and outer 50 major side surfaces.

A plurality of grooves 54 are formed in the inner major side surface 48 of the burst panel 44. The grooves 54 extend radially between a circular central portion 56 of the burst panel 44 and an annular outer peripheral portion 58 of the burst panel. The grooves 54 do not extend into either the central portion 56 of the burst panel 44 or the outer peripheral portion 58 of the burst panel.

The grooves 54 define a plurality of sector-shaped panel portions 60 of the burst panel 44. The sector-shaped panel portions 60 are of uniform thickness between the inner 48 and outer 50 major side surfaces of the burst panel 44. The grooves 54 form predetermined weakened portions of the burst panel 44, located between the sector-shaped portions 60. The sector-shaped portions 60 are held together by the predetermined weakened portions of the burst panel 44, by the circular central portion 56 of the burst panel, and by the annular outer peripheral portion 58 of the burst panel.

The burst panel 44 has an initiator support portion 62 (FIG. 3). The initiator support portion 62 includes the central portion 56 of the burst panel 44 and an axially extending socket portion 64 of the burst panel. The socket portion 64 of the burst panel 44 extends from the outer major side surface 50 of the burst panel at a location centered on the axis A.

The outer side surface 28 of the back wall 22 of the housing has a circular groove 68 at a location radially outward of the outer peripheral portion 58 of the burst panel 44. The inner side surface 26 of the back wall 22 of the housing 16 also has a circular groove 72 at a location radially outward of the outer peripheral portion 58 of the burst panel 44. The two grooves 68, 72 overlie each other to form a circular predetermined weakened portion of the back wall 22 of the housing 16. The weakened portion is located immediately radially outward of the burst panel 44.

The weakened portion supports the outer peripheral portion 58 of the burst panel 44, and thereby the entire burst panel, on the back wall 22 of the housing 16. The weakened portion is rupturable, as described below, to detach the burst panel 44 from the back wall 22 of the housing 16 and form a vent opening 74 in the housing. When the weakened portion is not ruptured and the burst panel 44 is attached to the back wall 22 of the housing 16, the vent opening 74 is closed, or covered, by the burst panel.

The vent assembly 42 also includes an initiating means 76 for detaching the burst panel 44 from the housing 16. In the illustrated embodiment, the initiating means 76 is an air bag inflator initiator of a type generally known in the art. Other types of initiating means, which are known in the art, can be used, such as, shaped charges, microdets, and pins driven against the burst panel 44 by pyrotechnic or electromagnetic devices.

The initiator 76 (FIG. 3) is mounted in the socket portion 64 of the initiator support portion 62 of the burst panel 44. The initiator 76 may be mounted in the initiator support portion 62 of the burst panel 44 by any one of a variety of methods including crimping, heat staking and adhesive. The initiator 76 is centered on the axis A and has lead wires 78 that project from the initiator in a direction out of the chamber 32.

The lead wires 78 of the initiator 76 are connected with vehicle electric circuitry indicated schematically at 80 (FIG. 1). The vehicle electric circuitry 80 controls the operation of the inflator 38, the initiator 76 and the vent assembly 42. The vehicle electric circuitry 80 includes a power source 82, which is preferably the vehicle battery and/or a capacitor, and a normally open switch 84. The switch is part of a collision sensor 86, which senses a condition indicating the occurrence of a vehicle collision. The collision-indicating condition may comprise, for example, sudden vehicle deceleration caused by a collision.

The vehicle electric circuitry 80 further includes a control module 88 for controlling the operation of the vehicle electric circuitry, and an occupant position sensor 90. The occupant position sensor 90 generates a control signal indicative of the position of a vehicle occupant in the interior of a vehicle. Other sensors that could be used in place of, or together with, the occupant position sensor include a weight sensor, a belt tension sensor, an occupant size sensor, a module temperature sensor, and a crash severity sensor.

If a collision-indicating condition sensed by the collision sensor 86 is above a predetermined threshold, it indicates the occurrence of a collision for which inflation of the air bag 12 is desired to help protect the occupant of the vehicle. The switch 84 in the collision sensor 86 closes and the control module 88 transmits an actuation signal to the inflator 38 over lead wires 94. When the inflator 38 is actuated, it emits a large volume of inflation fluid into the chamber 32 in the housing 16. The housing 16 directs the inflation fluid from the inflator 38 into the air bag 12 to inflate the air bag.

As the inflation fluid begins to inflate the air bag 12, the air bag moves rapidly and forcefully outward against the deployment door 36. The inflating air bag 12 moves the deployment door 36 outward and the air bag inflates through the deployment opening 34 into a position to help protect the vehicle occupant.

Upon such an occurrence of a condition requiring actuation of the inflator 38, the control module 88 receives control signals from the collision sensor 86 and the position sensor 90 to determine whether it is desirable to actuate the vent assembly 42. This determination, as well as the actuation of the vent assembly 42 itself, can be made prior to actuation of the inflator 38, or at the same time as actuation of the inflator, or after actuation of the inflator.

The control signal from the collision sensor 86 may indicate the occurrence of a vehicle collision at a relatively high speed. Also, the control signal from the position sensor 90 may indicate a condition in which the vehicle occupant is positioned at least a predetermined distance from the air bag module 14. If the control module 88 receives one or both of these control signals, the control module determines that the burst panel 44 of the vent assembly 42 should remain attached to the housing 16. Thus, the initiator 76 is not actuated by the control module 88. The burst panel 44 remains attached to the back wall 22 of the housing 16 by the predetermined weakened portion. The vent opening 74 remains covered by the burst panel 44. As a result, the air bag 12 inflates with maximum speed and force.

On the other hand, the control signal from the collision sensor 86 may indicate the occurrence of a vehicle collision at relatively low speed. Also, the control signal from the position sensor 90 may indicate a condition in which the vehicle occupant is closer than a predetermined distance to the air bag module 14. If the control module 88 receives one or both of these control signals, the control module determines that the burst panel 44 of the vent assembly 42 should be detached from the housing 16 to vent inflation fluid.

A control signal is transmitted from the control module 88, through the lead wires 78, to the initiator 76 of the vent assembly 42. The initiator 76 is actuated and generates a force that causes the sector-shaped portions 60 of the burst panel 44 to separate along the predetermined weakened portions. Additionally, the force of actuation causes the back wall 22 of the housing 16 to rupture along the circular predetermined weakened portion located radially outward of the outer peripheral portion 58 of the burst panel 44. Thus, the entire burst panel 44 breaks off of the housing 16. The burst panel 44 moves from an attached condition as shown in FIG. 3 to the detached condition spaced apart from the housing 16 as shown in FIG. 4 after actuation.

When the burst panel 44 is spaced apart from the housing 16, the vent opening 74 in the back wall 22 of the housing is completely open, or uncovered. The burst panel 44 does not remain in contact with any portion of the housing 16. Uncovering the vent opening 74 enables inflation fluid from the inflator 38 to flow out of the chamber 32. The inflation fluid that flows out of the chamber 32 through the vent opening 74 does not flow into the air bag 12 to inflate the air bag. As a result, the amount of inflation fluid flowing into the air bag 12, or the pressure of the inflation fluid, is reduced as compared to the amount or pressure of inflation fluid flowing into the air bag when the vent opening remains covered by the burst panel in the attached condition. This reduction in the flow of inflation fluid can help to reduce the speed and force of deployment of the air bag 12.

It should be noted that the burst panel 44 can be located on the back wall 22 of the housing 16, as shown, or alternatively on one of the side walls 18 or 20. The housing 16 can have several burst panels formed into the back wall 22 as well as into the side walls 18 or 20. Alternatively, the housing 16 can have a single burst panel 44 formed into either the back wall 22 or one of the side walls 18 or 20.

Figure 5:
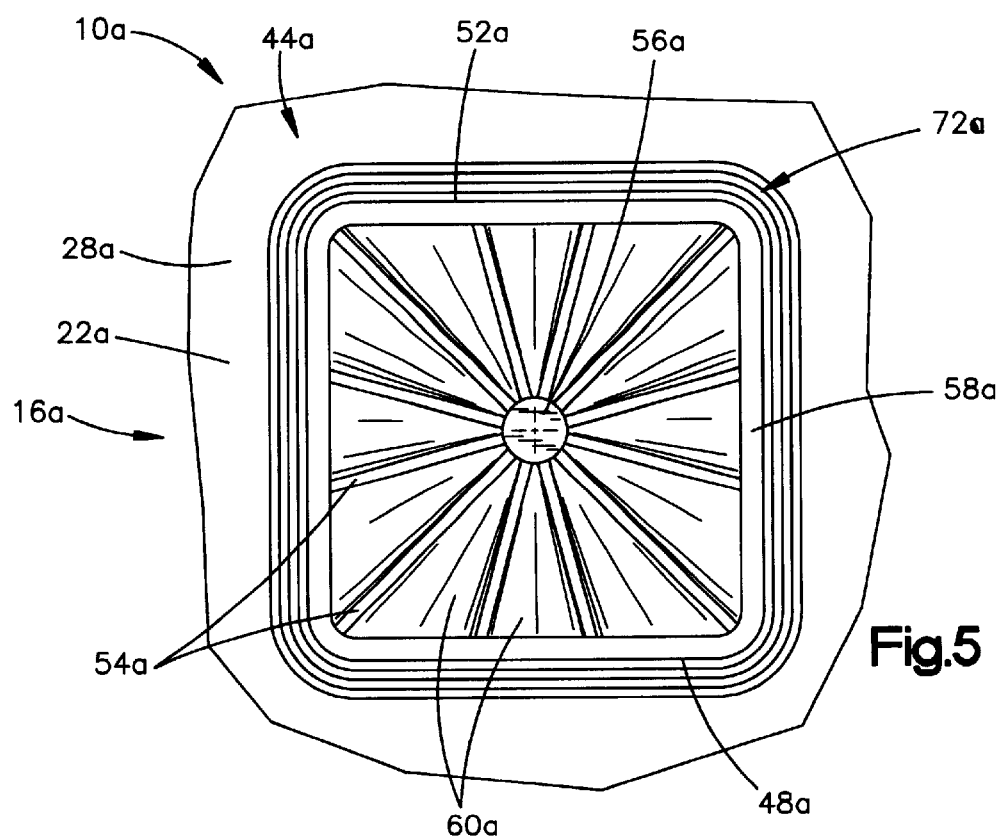
FIG. 5 is a view similar to FIG. 2 of a second embodiment of the apparatus of FIG. 1.

FIG. 5 illustrates a portion of an apparatus 10a constructed in accordance with a second embodiment of the invention. The apparatus 10a is similar to the apparatus 10 FIGS. 1–4, and parts that are the same or similar are given the same reference numerals with the suffix "a" attached.

The apparatus 10a includes a burst panel 44a having a rectangular configuration, rather than a circular configuration. Specifically, the burst panel 44a has a square configuration. In other aspects, the burst panel 44a is similar to the burst panel 44 (FIGS. 1–4), and is rupturable and detachable in a similar manner. It should be understood that a burst panel, or detachable portion, in accordance with the present invention, can have any suitable configuration, not limited to those shown and described herein.

FIG. 6 illustrates a portion of an apparatus 10b constructed in accordance with a third embodiment of the invention. The apparatus 10b is similar to the apparatus 10, and parts that are the same or similar are given the same reference numerals with the suffix "b" attached.

The apparatus 10b includes a burst panel 44b that snaps into engagement with the back wall 22b of the housing 16b, rather than being formed as one piece with the back wall. In other aspects, the burst panel 44b is similar to the burst panel 44 (FIGS. 1–4), and is rupturable and detachable in a similar manner.

Specifically, the outer peripheral portion 58b of the burst panel 44b has a cylindrical outer peripheral surface 52b that extends from an outer major side surface 50b of the burst panel 44b, in a direction parallel to the axis B. A groove 96 is formed in the outer side peripheral surface 52b. The groove 96 extends completely around the burst panel 44b. A frustoconical peripheral surface 98 extends between the groove 96 and an inner side surface 48b of the burst panel 44b.

The back wall 22b of the housing 16b has a preformed vent opening 74b. The burst panel 44b is assembled to the back wall 22b of the housing 16b by pushing the burst panel into the vent opening 74b of the housing to cover the vent opening. The frustoconical surface 98 on the burst panel 44b engages the back wall 22b of the housing 16b and slides through the vent opening 74b, until the back wall snaps into the groove 96 in the burst panel, to the condition shown in FIG. 6.

FIG. 7 illustrates a portion of an apparatus 10c constructed in accordance with a fourth embodiment of the invention. The apparatus 10c is similar to the apparatus 10, and parts that are the same or similar are given the same reference numerals with the suffix "c" attached.

The apparatus 10c includes a burst panel 44c that is crimped into engagement with the back wall 22c of the housing 16c, rather than being formed as one piece with the back wall 22c. In other aspects, the burst panel 44c is similar to the burst panel 44 (FIGS. 1–4), and is rupturable and detachable in a similar manner.

Specifically, the outer peripheral portion 58c of the burst panel 44c, before assembly to the back wall 22c of the housing 16c, has an L-shaped configuration as shown in dashed lines in FIG. 7. The L-shaped configuration includes a relatively short first leg 100 having an annular configuration centered on and extending radially of the axis C, and a relatively long second leg 102 having a cylindrical configuration centered on and extending parallel to the axis C. The two legs 100, 102 define an annular stop surface 104 that extends perpendicular to the axis C and generally parallel to the back wall 22c of the housing 16c.

The back wall 22c of the housing 16c has a preformed vent opening 74c. The burst panel 44c is assembled to the back wall 22c of the housing 16c by inserting the burst panel into the vent opening 74c of the housing to cover the vent opening. When the stop surface 104 on the burst panel 44c engages the back wall 22c of the housing 16c, the second leg 102 of the burst panel projects through the vent opening 74c, as shown in dashed lines in FIG. 7. The projecting portion of the second leg 102 is then deformed, or crimped, into engagement with the back wall 22c of the housing 16c, as shown in solid lines in FIG. 7. The engagement of the crimped portion with the back wall 22c of the housing 16c secures the burst panel 44c to the housing.

FIG. 8 illustrates a portion of an apparatus 10*d* constructed in accordance with a fifth embodiment of the invention. The apparatus 10*d* is similar to the apparatus 10, and parts that are the same or similar are given the same reference numerals with the suffix "d" attached.

The apparatus 10*d* includes a burst panel 44*d* that is heat staked onto a base plate 106 of an air bag module 108, rather than being formed as one piece with a back wall 22 of a housing 16. In other aspects, the burst panel 44*d* is similar to the burst panel 44 (FIGS. 1–4), and is rupturable and detachable in a similar manner.

Specifically, the base plate 106 is a structure that supports the other components of the air bag module on the vehicle, typically on the vehicle steering wheel. The base plate 106, as illustrated, has a portion with a generally planar configuration. A plurality of fasteners 110 support an inflator 112 and a retainer 114 on the base plate 106. The retainer 114 secures an air bag 116 to the base plate 106. The base plate 106 has a preformed vent opening 124 located adjacent the inflator 112.

The outer peripheral portion of the burst panel 58*d*, before assembly to the base plate 106, has an L-shaped configuration as shown in dashed lines in FIG. 8. The L-shaped configuration includes a relatively short first leg 118 having an annular configuration centered on and extending radially of the axis D, and a relatively long second leg 120 having a cylindrical configuration centered on and extending parallel to the axis D. The two legs 118, 120 define an annular stop surface 122 that extends perpendicular to the axis D and generally parallel to the base plate 106.

The burst panel 44*d* is assembled to the base plate 106 by inserting the burst panel 44*d* into the vent opening 124 of the base plate to cover the vent opening. When the stop surface 122 on the burst panel engages the base plate 106, the second leg 120 of the burst panel 44*d* projects through the vent opening 108, as shown in dashed lines in FIG. 8. The projecting portion of the second leg 120 is then heated and deformed into engagement with the base plate 106, as shown in solid lines in FIG. 8. When the deformed portion of the burst panel 44*d* cools, it blocks movement of the burst panel off the base plate 106, thus securing the burst panel to the base plate.

From the above description of the invention, those skilled in the art will perceive improvements, changes and modifications in the invention. Such improvements, changes and modifications within the skill of the art are intended to be covered by the appended claims.

Having described the invention, I claim the following:

1. A vehicle occupant protection apparatus comprising:
   a sensor for sensing a vehicle collision;
   an inflatable vehicle occupant protection device having a deflated condition and an inflated condition for helping to protect a vehicle occupant;
   an inflation fluid source actuatable to provide inflation fluid to inflate said inflatable device;
   a housing for directing inflation fluid under pressure from said inflation fluid source toward said inflatable device upon actuation of said inflation fluid source; and
   at least one rupturable burst panel attached to said housing, said burst panel having a unitary structure with opposing surfaces spaced from each other by a surface extending between said opposing surfaces, said burst panel being attached to said housing only at said surface extending between said opposing surfaces; and
   initiating means for, when actuated, enabling said at least one burst panel to detach from said housing to a condition in which no portion of said burst panel remains attached to any portion of said housing to enable flow of inflation fluid out of said housing away from said inflatable device through an opening in said housing.

2. An apparatus as set forth in claim 1 wherein said opening is pre-formed in said housing, said burst panel covering said opening when attached to said housing.

3. An apparatus as set forth in claim 1 wherein said opening is formed in said housing after detaching said burst panel from said housing.

4. An apparatus as set forth in claim 1 wherein said burst panel has a disc-like configuration with parallel, circular inner and outer major side surfaces and a plurality of grooves formed on said inner major side surface between sector-shaped portions of uniform thickness, said grooves forming predetermined rupturable weakened portions of said burst panel.

5. An apparatus as set forth in claim 4 wherein said grooves and said sector-shaped portions extend radially from a circular central portion of said burst panel to an annular outer peripheral portion of the burst panel.

6. An apparatus as set forth in claim 1 wherein said burst panel includes an initiator support portion for supporting said initiating means, including a central portion of said burst panel and an axially extending socket portion of said burst panel, said socket portion extending from an outer major side surface of said burst panel.

7. An apparatus as set forth in claim 1 wherein said housing is a reaction canister.

8. An apparatus as set forth in claim 1 wherein said initiating means is an air bag inflator initiator.

9. An apparatus as set forth in claim 1 further including vehicle electric circuitry having a control module for controlling actuation of said inflation fluid source and said initiating means, said control module causing said initiating means to actuate to enable said burst panel to detach from said housing in response to determining the existence of a second condition, and wherein said sensor generates a signal to said control module upon the occurrence of a vehicle collision.

10. A vehicle occupant protection apparatus comprising:
   an inflatable vehicle occupant protection device having a deflated condition and an inflated condition for helping to protect a vehicle occupant;
   an inflation fluid source actuatable to provide inflation fluid to inflate said inflatable device;
   a structure for providing an opening for enabling flow of inflation fluid away from said inflatable device;
   said structure having at least one burst panel having a first condition closing said opening and a second condition spaced apart from said structure; and
   initiation means for, when actuated, enabling said burst panel to move from the first condition to the second condition;
   said structure being a housing for directing inflation fluid under pressure from said inflation fluid source toward said inflatable device upon actuation of said inflation fluid source,
   said burst panel having a disc-like configuration with parallel, circular inner and outer major side surfaces and an outer peripheral portion having a cylindrical outer side surface extending from said outer major side surface of said burst panel in a direction toward said inner major side surface, a groove extending around said burst panel, and a frustoconical surface extending between said groove and said inner major side surface of said burst panel.

11. An apparatus as set forth in claim 10 wherein said housing has an opening, said burst panel being attached to said housing by inserting said burst panel into said opening of said housing to cover said opening, said frustoconical surface on said burst panel engaging said housing and sliding through said opening until said housing snaps into said groove on said burst panel.

12. A vehicle occupant protection apparatus comprising:

an inflatable vehicle occupant protection device having a deflated condition and an inflated condition for helping to protect the vehicle occupant;

an inflation fluid source actuatable to provide inflation fluid to inflate said inflatable device;

a structure defining an opening for enabling flow of inflation fluid away from said inflatable device;

at least one rupturable burst panel attached to said structure and having a first condition in which said burst panel is located in said opening and a second condition in which said burst panel is located spaced apart from said structure; and initiation means for, when actuated, enabling said burst panel to move from the first condition to the second condition.

13. An apparatus as set forth in claim 12 wherein said structure is a housing for directing inflation fluid under pressure from said inflation fluid source toward said inflatable device upon actuation of said inflation fluid source.

14. An apparatus as set forth in claim 13 wherein said housing has an opening, said burst panel, before attachment to said housing, has an L-shaped outer peripheral portion having a short first leg and a long second leg, said two legs defining an annular stop surface that extends generally parallel to said housing.

15. An apparatus as set forth in claim 14 wherein said burst panel is attached to said housing by inserting said burst panel into said opening to cover said opening until said stop surface engages said housing and said second leg projects through said opening, said second leg being deformed by crimping into engagement with said housing.

16. An apparatus as set forth in claim 12 wherein said structure is an air bag module base plate for supporting said inflatable device and said inflation fluid source.

17. An apparatus as set forth in claim 16 wherein said base plate has an opening, said burst panel, before attachment to said base plate, has an L-shaped outer peripheral portion having a short first leg and a long second leg, said two legs defining an annular stop surface that extends generally parallel to said base plate.

18. An apparatus as set forth in claim 17 wherein said burst panel is attached to said base plate by inserting said burst panel into said opening to cover said opening until said stop surface engages said base plate and said second leg projects through said opening, said second leg being deformed into engagement with said base plate.

19. An apparatus as set forth in claim 12 wherein said initiation means comprises a pyrotechnic initiator.

20. The apparatus according to claim 12 wherein said burst panel is attached to said structure without a threaded fastener.

21. The apparatus according to claim 12 wherein no portion of said burst panel in said second condition remains attached to any portion of said structure.

22. The apparatus according to claim 12 wherein said burst panel bursts apart into several pieces upon actuation of said initiation means.

23. The apparatus according to claim 12 wherein said opening defines an empty space.

24. The apparatus according to claim 1 wherein said burst panel bursts apart into several pieces upon actuation of said initiating means.

25. The apparatus according to claim 24 wherein said housing defines an opening for venting a portion of inflation fluid away from said inflatable device, said opening defining an empty space.

26. The apparatus according to claim 25 wherein said burst panel is attached to said housing in said opening.

* * * * *